(12) United States Patent
Ando

(10) Patent No.: US 11,780,388 B2
(45) Date of Patent: Oct. 10, 2023

(54) GROMMET

(71) Applicant: SUMITOMO WIRING SYSTEMS, LTD., Mie (JP)

(72) Inventor: Yusuke Ando, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 105 days.

(21) Appl. No.: 17/497,007

(22) Filed: Oct. 8, 2021

(65) Prior Publication Data

US 2022/0126768 A1 Apr. 28, 2022

(30) Foreign Application Priority Data

Oct. 28, 2020 (JP) ................................. 2020-180660

(51) Int. Cl.
| | |
|---|---|
| *B60R 16/02* | (2006.01) |
| *F16L 5/10* | (2006.01) |
| *H02G 3/22* | (2006.01) |
| *H02G 3/04* | (2006.01) |

(52) U.S. Cl.
CPC ............ *B60R 16/0222* (2013.01); *F16L 5/10* (2013.01)

(58) Field of Classification Search
CPC ...... H02G 3/0462; H02G 3/0406; H02G 3/22; B60R 16/0222; F16L 5/10
See application file for complete search history.

(56) References Cited

U.S. PATENT DOCUMENTS

| | | | | |
|---|---|---|---|---|
| 5,739,475 | A * | 4/1998 | Fujisawa | B60R 16/0222 174/153 G |
| 2007/0143956 | A1* | 6/2007 | Kumakura | F16L 5/10 16/2.2 |
| 2014/0021688 | A1* | 1/2014 | Hattori | H02G 3/088 277/606 |
| 2015/0144378 | A1 | 5/2015 | Asayama | |
| 2016/0039368 | A1* | 2/2016 | Shitamichi | F16L 5/02 16/2.2 |
| 2021/0257131 | A1* | 8/2021 | Kiyota | H01B 17/583 |

* cited by examiner

*Primary Examiner* — Hoa C Nguyen
*Assistant Examiner* — Amol H Patel
(74) *Attorney, Agent, or Firm* — Venjuris, P.C.

(57) ABSTRACT

Provided is a grommet that can improve the water-blocking property. A grommet includes an opposing portion 32 that opposes a portion surrounding a mounting hole 12 in a vehicle body panel 11, a first water-blocking portion 33 that extends from the opposing portion 32 and comes in contact with the vehicle body panel 11, and a second water-blocking portion 34 that extends from the opposing portion 32 and comes in contact with the vehicle body panel 11. Each of the first water-blocking portion 33 and the second water-blocking portion 34 is formed in an annular shape that surrounds the mounting hole 12. The second water-blocking portion 34 is provided on the outer circumferential side with respect to the first water-blocking portion 33.

13 Claims, 4 Drawing Sheets

GROMMET

CROSS-REFERENCE TO RELATED APPLICATIONS

This application is based on and claims priority from Japanese Patent Application No. 2020-180660, filed on Oct. 28, 2020, with the Japan Patent Office, the disclosure of which is incorporated herein in their entireties by reference.

TECHNICAL FIELD

The present disclosure relates to a grommet.

BACKGROUND

A grommet disclosed in Japanese Patent Laid-open Publication No. 2014-033564 is configured to be mounted into a mounting hole formed in a vehicle body panel and block water from entering between the mounting hole and a wire harness that is inserted into the mounting hole, for example. Specifically, the grommet includes an annular seal portion that comes in close contact with the portion surrounding the mounting hole in the vehicle body panel, and the seal portion suppresses water or the like from entering the mounting hole.

SUMMARY

The inventor of the present invention examined configurations of a seal portion that can improve the water blocking property in a grommet such as described above.

In view of this, an object of the present invention is to provide a grommet that can improve the water blocking property.

A grommet according to the present disclosure is a grommet that is to be mounted into a mounting hole of a vehicle body panel through which a wire harness is to be passed, the grommet including an opposing portion that is to oppose a portion surrounding the mounting hole in the vehicle body panel, a first water-blocking portion that extends from the opposing portion and is to come in contact with the vehicle body panel, and a second water-blocking portion that extends from the opposing portion and is to come in contact with the vehicle body panel, and each of the first water-blocking portion and the second water-blocking portion is formed in an annular shape that is to surround the mounting hole, and the second water-blocking portion is provided on an outer circumferential side with respect to the first water-blocking portion.

According to this configuration, when water enters through the mounting hole from the one side face side of the vehicle body panel toward another side face, the water can be suppressed from entering at multiple stages by the first water-blocking portion and the second water-blocking portion. In this manner, the water blocking property of the grommet can be improved.

According to the present disclosure, it is possible to provide a grommet that can improve the water blocking property.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
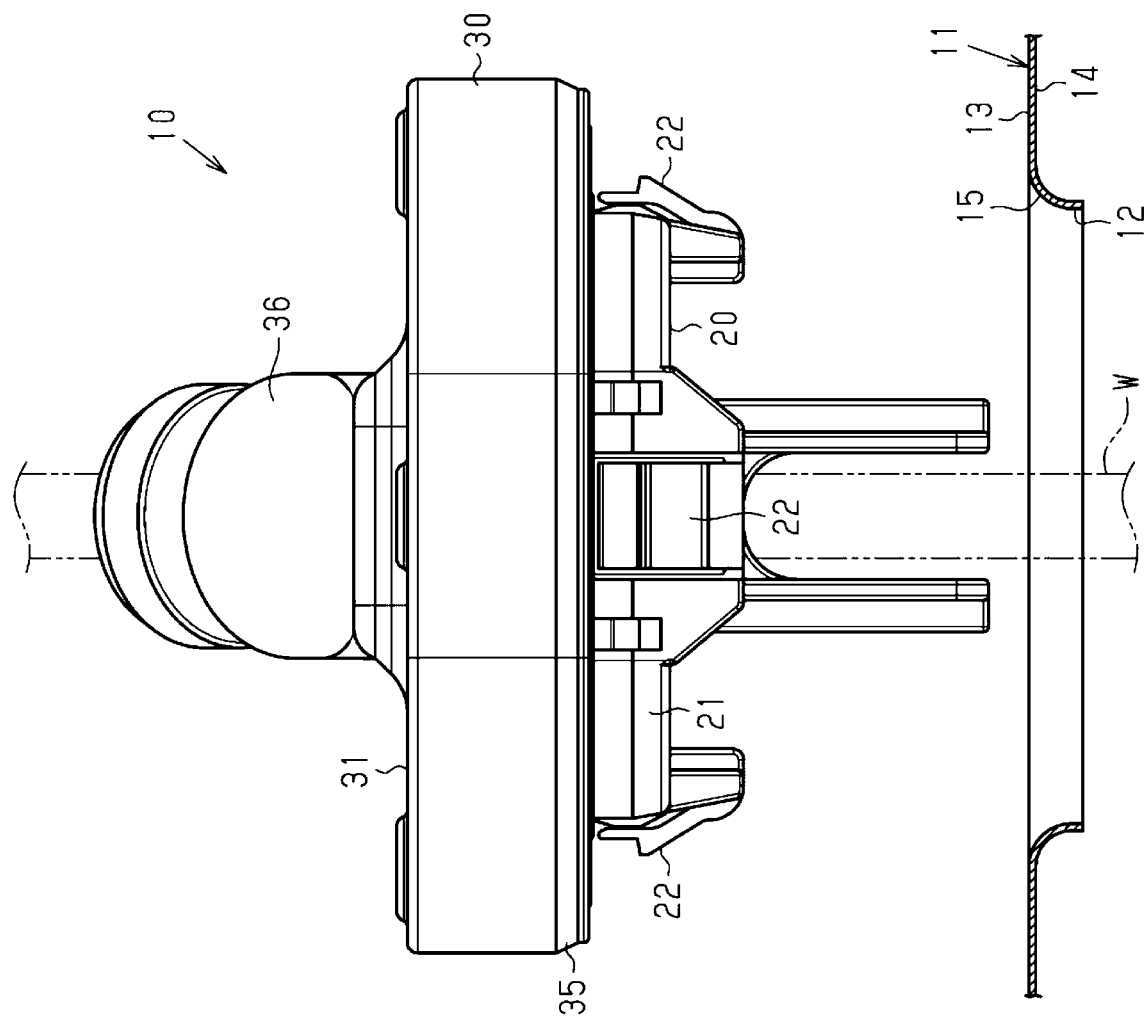
FIG. 1 is a side view of a grommet of an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of the Embodiments of the Disclosure

First, embodiments of the present disclosure will be listed and illustrated.

A grommet of the present disclosure is [1] A grommet that is to be mounted into a mounting hole of a vehicle body panel through which a wire harness is to be passed, the grommet including an opposing portion that is to oppose a portion surrounding the mounting hole in the vehicle body panel, a first water-blocking portion that extends from the opposing portion and is to come in contact with the vehicle body panel, and a second water-blocking portion that extends from the opposing portion and is to come in contact with the vehicle body panel, and each of the first water-blocking portion and the second water-blocking portion is formed in an annular shape that is to surround the mounting hole, and the second water-blocking portion is provided on an outer circumferential side with respect to the first water-blocking portion.

According to this configuration, when water enters through the mounting hole from the one side face side of the vehicle body panel toward another side face, the water can be suppressed from entering at multiple stages by the first water-blocking portion and the second water-blocking portion. In this manner, the water blocking property of the grommet can be improved.

[2] A configuration is possible in which, an inner member including a tube portion into which the wire harness is to be inserted and a flange portion that extends from the tube portion toward the outer circumference, and a grommet main body including the opposing portion, the first water-blocking portion, and the second water-blocking portion, and the inner member is formed by a material that is more rigid than the grommet main body, the tube portion is to be inserted into the mounting hole, the opposing portion, the first water-blocking portion, and the second water-blocking portion are to be sandwiched and compressed by the flange portion and the vehicle body panel, and the first water-blocking portion is to be sandwiched by a circumferential edge of the mounting hole and the tube portion in a first direction that is orthogonal to a central axis line of the mounting hole.

With this configuration, the first water-blocking portion is sandwiched between the circumferential edge of the mounting hole and the tube portion of the inner member. Accordingly, it is possible to favorably water-block the gap between the circumferential edge of the mounting hole and the tube portion with the first water-blocking portion.

[3] A configuration is possible in which the vehicle body panel includes a bent portion in which the circumferential edge of the mounting hole is bent to an opposite side to the opposing portion side, and the first water-blocking portion is to be sandwiched by the bent portion and the tube portion in the first direction.

With this configuration, the first water-blocking portion is sandwiched between the bent portion provided at the circumferential edge of the mounting hole and the tube portion of the inner member. In this manner, a configuration can be achieved in which the first water-blocking portion is not in contact with the circumferential edge of the mounting hole. Accordingly, damage to the first water-blocking portion can be suppressed, and as a result, deterioration of the water blocking property of the first water-blocking portion can be suppressed.

[4] A configuration is also possible in which the vehicle body panel is a panel that partitions a vehicle interior and a vehicle exterior of a vehicle, and the opposing portion, the first water-blocking portion, and the second water-blocking portion are located on the vehicle interior side of the vehicle body panel.

Water is likely to enter from the vehicle exterior side of the vehicle body panel. When water on the vehicle exterior attempts to enter the vehicle interior through a gap between the circumferential edge of the mounting hole and the tube portion of the inner member, entry of the water can be suppressed first by the first water-blocking portion, and then by the second water-blocking portion.

[5] A configuration is also possible in which a supporting portion that extends from the opposing portion and is to come in contact with the vehicle body panel, and the supporting portion is formed in an annular shape that surrounds the mounting hole, and the supporting portion is provided on the outer circumferential side with respect to the second water-blocking portion.

With this configuration, due to the supporting portion that is in contact with the vehicle body panel, the orientation of the grommet in the state of being mounted to the vehicle body panel is stabilized. Accordingly, it is possible to suppress a case in which the orientation of the grommet inclines with respect to the mounting hole due to a force received from the wire harness, for example. As a result, it is possible to suppress a case in which the contact pressure of the first water-blocking portion and the second water-blocking portion with respect to the vehicle body panel is partially decreased.

[6] The supporting portion may extend from an outer edge of the opposing portion.

With this configuration, it is possible to suppress the inclination of the grommet more favorably due to the supporting portion that extends from the outer edge of the opposing portion.

[7] A configuration is also possible in which an entire circumference of the supporting portion is to be in close contact with the vehicle body panel.

With this configuration, it is possible to block water that runs along the vehicle body panel with the supporting portion.

[8] A configuration is also possible in which the second water-blocking portion includes a first lip portion that extends from the opposing portion side toward the vehicle body panel while inclining toward the outer circumference, and a second lip portion that extends from the opposing portion side toward the vehicle body panel while inclining toward an inner circumference, which is toward the first water-blocking portion.

With this configuration, when the first lip portion and the second lip portion are brought into close contact with the vehicle body panel, it is possible to make the second water-blocking portion suction to the vehicle body panel due to a space surrounded by the first lip portion, the second lip portion, and the vehicle body panel being converted to negative pressure. When the second water-blocking portion suctions to the vehicle body panel, a gap is unlikely to occur between the vehicle body panel and the second water-blocking portion, and as a result, the water blocking property of the second water-blocking portion can be improved.

[9] A configuration is also possible in which, in a state in which the grommet is mounted to the vehicle body panel, each of the first lip portion and the second lip portion is spaced apart from the opposing portion.

With this configuration, it is possible to prevent a case in which the first lip portion and the second lip portion that are stuck to the vehicle body panel are squashed by the opposing portion. As a result, it is possible to favorably maintain a state in which the first lip portion and the second lip portion are stuck to the vehicle body panel.

[10] A configuration is also possible in which the second water-blocking portion includes a base portion that extends from the opposing portion, and the first lip portion and the second lip portion extend from a leading end of the base portion.

With this configuration, it is possible to reduce an insertion force at the time of inserting the grommet into the mounting hole, due to deformation of the base portion, while the first lip portion and the second lip portion are brought into close contact with the vehicle body panel. As a result, it is possible to contribute to the improvement of mountability of the grommet.

[11] A configuration is also possible in which the base portion extends toward the vehicle body panel while inclining toward the outer circumference or the inner circumference.

With this configuration, when the second water-blocking portion is pressed against the vehicle body panel, the base portion of the second water-blocking portion can be favorably bent toward the outer circumference or the inner circumference. In this manner, it is possible to reduce an insertion force more favorably at the time of inserting the grommet into the mounting hole. As a result, it is possible to further contribute to the improvement of mountability of the grommet.

[12] A configuration is also possible in which the base portion extends toward the vehicle body panel while inclining toward the outer circumference, and the base portion and the first lip portion extend in the same direction.

With this configuration, it is possible to favorably bring the first lip portion into close contact with the vehicle body panel.

[13] A configuration is also possible in which the second lip portion includes a first extended portion that extends from the base portion and a second extended portion that extends from the leading end of the first extended portion, and an inclination of the second extended portion is closer to perpendicular to the vehicle body panel than the inclination of the first extended portion.

With this configuration, it is possible to bring the leading end of the second lip portion, which is the leading end of the second extended portion, into contact with the vehicle body panel at an angle closer to perpendicular to the vehicle body panel. In this manner, it is possible to favorably bring the second lip portion into close contact with the vehicle body panel.

[14] A configuration is also possible in which a leading end position of the first lip portion is spaced further apart from the opposing portion than is a leading end position of the second lip portion.

With this configuration, when the grommet is inserted into the mounting hole, in the second water-blocking portion, the first lip portion first comes in contact with the vehicle body panel, and the second lip portion then comes in contact with the vehicle body panel. In this manner, in the state of being mounted to the vehicle body panel, the first lip portion and the second lip portion can be compressively deformed more favorably.

Details of Embodiments of the Present Disclosure

Specific examples of the grommet of the present disclosure will be described hereinafter with reference to the drawings. In the drawings, for illustrative reasons, portions of the configuration may be emphasized or simplified in some cases. Also, dimensional proportions of the portions are different in the drawings in some cases. "Parallel", "orthogonal", and "perpendicular" in the present specification include not only being exactly parallel, orthogonal, and perpendicular but also approximately parallel, orthogonal, and perpendicular within a range in which the operation and effects of the present embodiment can be achieved.

Note that "tubular" used in the description of the present specification includes not only a shape in which a circumferential wall is continuously formed on the entire circumference, but also a tubular shape formed by combining multiple parts and a shape partially including a cutout in the circumferential direction such as a C shape. Also, a "tubular" shape includes a circle, an oval, or a polygon including sharp or rounded corners. Also, "annular" used in the description of the present specification may mean any structure that forms a loop, a continuous shape without ends, or a general loop-shaped structure having a gap such as a C shape, for example. Note that an "annular" shape includes a circle, an oval, and a polygon having sharp or rounded corners, but there is no limitation to this.

A grommet 10 of the present embodiment shown in FIG. 1 is mounted into a mounting hole 12 formed in a vehicle body panel 11 of an automobile. A wire harness W is inserted into the mounting hole 12. The wire harness W is configured to include at least a single wire. The grommet 10 ensures the water blocking property of a region between the mounting hole 12 and the wire harness W. The grommet 10 also acts to prevent the wire harness W from interfering with the circumferential edge of the mounting hole 12.

A vehicle body panel 11 is a panel that partitions the vehicle interior and the vehicle exterior of the automobile, for example. The vehicle exterior includes, for example, an engine compartment. Out of the two surfaces of the vehicle body panel 11, the surface facing the vehicle interior is a first surface 13 and the other surface facing the vehicle exterior is a second surface 14. The vehicle body panel 11 includes a bent portion 15 formed by a circumferential edge of the mounting hole 12 being bent toward the second surface 14. The bent portion 15 is formed through burring, for example. The bent portion 15 is formed around the entire circumference of the mounting hole 12. The grommet 10 is mounted into the mounting hole 12 from the first surface 13 side, for example.

Overall Configuration of Grommet 10

Figure 2:
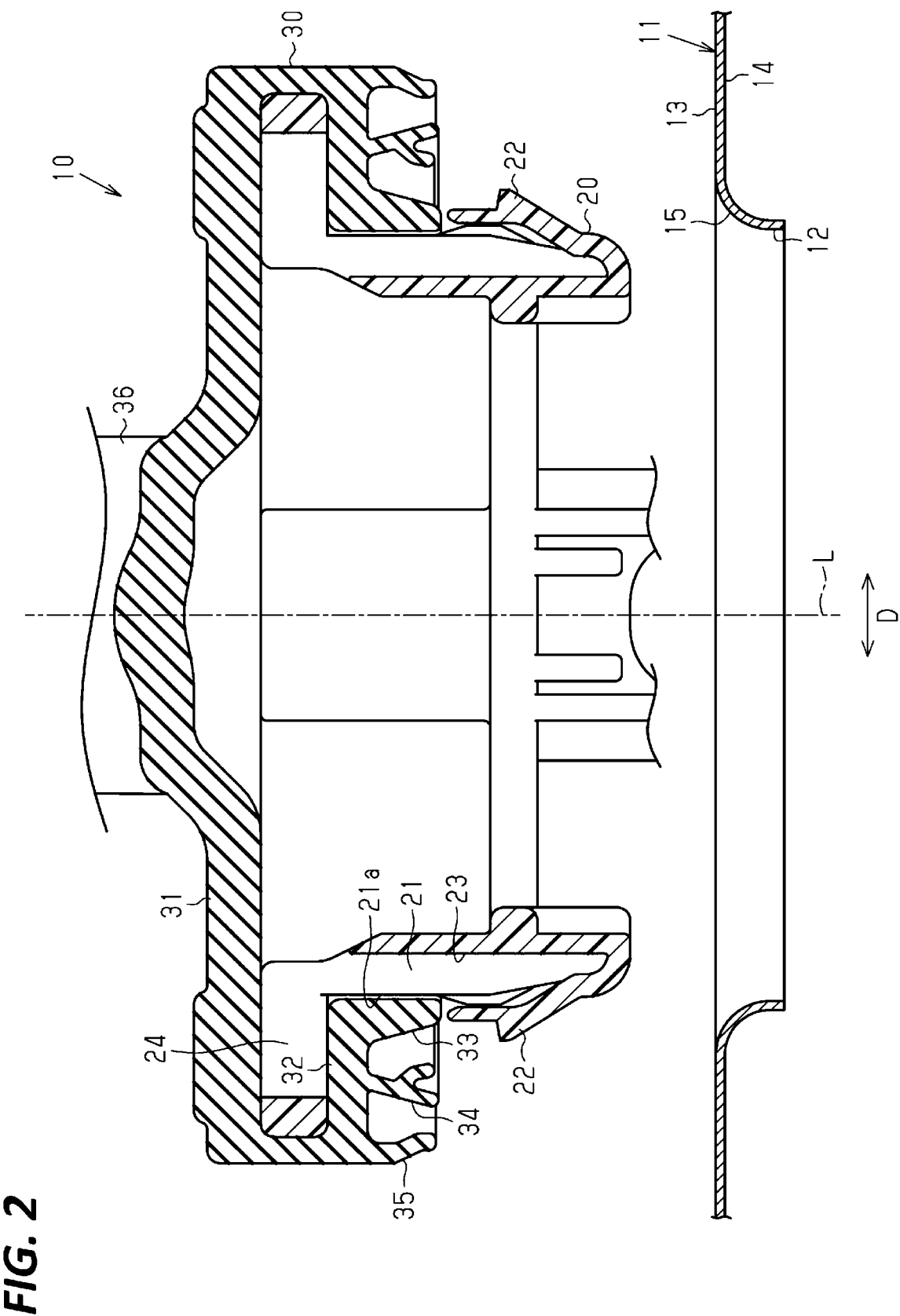
FIG. 2 is a cross-sectional view of the grommet of the embodiment.

As shown in FIG. 2, the grommet 10 is provided with an inner member 20 and a grommet main body 30.

The grommet main body 30 is formed by a highly flexible material. In other words, the grommet main body 30 is likely to deform as a whole. As a constituent material of the grommet main body 30, for example, an elastomer such as EPDM (specifically, ethylene propylene diene rubber) can be used. The inner member 20 is formed by a material that is more rigid than the grommet main body 30. That is, the inner member 20 is unlikely to deform as a whole. As the constituent material of the inner member 20, for example, a synthetic resin material such as PP (specifically, polypropylene) can be used.

Configuration of Inner Member 20

The inner member 20 includes a tube portion 21 that is inserted into the mounting hole 12. The tube portion 21 is formed in an annular shape that conforms to the circumferential edge of the mounting hole 12. Also, the tube portion 21 is formed in an annular shape that is slightly smaller than the circumferential edge of the mounting hole 12. The wire harness W is inserted into the tube portion 21. Note that, in the following description, a direction orthogonal to a central axis line L of the mounting hole 12 is referred to as a first direction D.

The tube portion 21 has locking pieces 22. A plurality of locking pieces 22 are provided, for example. The locking pieces 22 are configured to warp along the first direction D. The grommet 10 is fixed to the vehicle body panel 11 by the locking pieces 22 catching on the circumferential edge of the mounting hole 12. In an outer circumferential surface 21a of the tube portion 21, for example, a groove portion 23 that extends along the central axis line L of the mounting hole 12 is formed. The groove portion 23 is formed at the position opposing the locking pieces 22 in the first direction D.

The inner member 20 includes a flange portion 24 that extends from the tube portion 21 toward the outer circumference. The flange portion 24 is, for example, provided at one end in the axial direction of the tube portion 21. The outer shape of the flange portion 24 as seen in the central axis line L direction is larger than the mounting hole 12. In the state in which the grommet 10 is mounted to the vehicle body panel 11, the flange portion 24 is located on the first surface 13 side of the vehicle body panel 11. Note that, in the following description, "the state in which the grommet 10 is mounted to the vehicle body panel 11" may be simply referred to as "the mounted state".

Configuration of Grommet Main Body 30

The grommet main body 30 includes a covering portion 31, an opposing portion 32, a first water-blocking portion 33, a second water-blocking portion 34, and a supporting portion 35.

The covering portion 31 covers one side surface in the central axis line L direction of the flange portion 24 and one end portion of the tube portion 21. As shown in FIG. 1, the covering portion 31 includes a tubular insertion portion 36. The wire harness W is inserted into the insertion portion 36 in a state in which the water blocking property is ensured.

Figure 3:
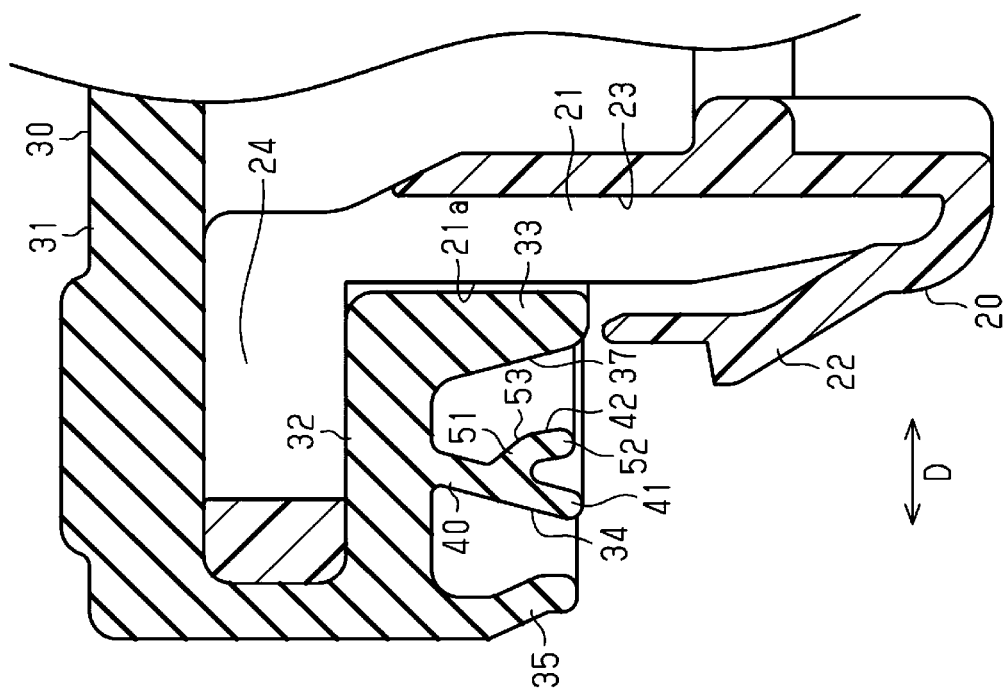
FIG. 3 is an enlarged cross-sectional view showing a main part of the grommet of the embodiment.

As shown in FIGS. 2 and 3, the opposing portion 32 is formed continuously with the outer edge of the covering portion 31. The opposing portion 32 is formed in an annular shape that conforms to the circumferential edge of the mounting hole 12, for example. The flange portion 24 is positioned between the opposing portion 32 and the covering portion 31. In this manner, the grommet main body 30 is held by the flange portion 24. In the mounted state, the opposing portion 32 opposes a portion surrounding the mounting hole 12 of the vehicle body panel 11 in a direction along the central axis line L.

An opposing surface of the opposing portion 32 that faces the vehicle body panel 11 is formed in a planar shape that is orthogonal to the central axis line L, for example. The first water-blocking portion 33, the second water-blocking portion 34, and the supporting portion 35 extend from the opposing surface. In the opposing surface, for example, a surface on the inner circumferential side with respect to the second water-blocking portion 34 and a surface on the outer circumferential side with respect to the second water-blocking portion 34 are located on a same plane.

Figure 4:
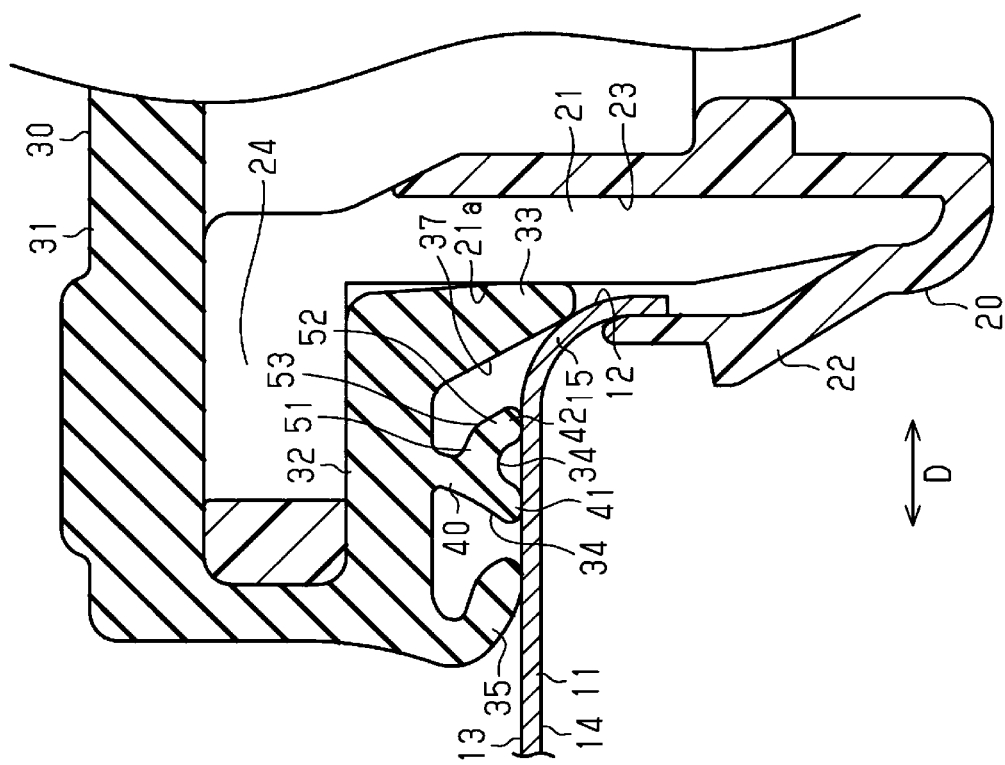
FIG. 4 is an enlarged cross-sectional view showing a main part of the grommet in a state of being mounted to a vehicle body panel.

As shown in FIG. 4, the first water-blocking portion 33, the second water-blocking portion 34, and the supporting portion 35 each extend from the opposing portion 32 and come in contact with the vehicle body panel 11. The first water-blocking portion 33, the second water-blocking portion 34, and the supporting portion 35 are each formed in an annular shape surrounding the mounting hole 12. The second water-blocking portion 34 is provided on the outer circumferential side with respect to the first water-blocking portion 33. The supporting portion 35 is provided on the outer circumferential side with respect to the second water-blocking portion 34. The opposing portion 32, the first water-blocking portion 33, the second water-blocking portion 34, and the supporting portion 35 are sandwiched and compressed between the flange portion 24 and the vehicle body panel 11. Note that, in the mounted state, the opposing portion 32, the first water-blocking portion 33, the second water-blocking portion 34, and the supporting portion 35 are located on the first surface 13 side, which is the vehicle interior side, of the vehicle body panel 11, for example. In this case, the first water-blocking portion 33, the second water-blocking portion 34, and the supporting portion 35 are in contact with the first surface 13 of the vehicle body panel 11.

Configuration of First Water-Blocking Portion 33

The first water-blocking portion 33 extends from the inner edge of the opposing portion 32, for example. The first water-blocking portion 33 extends approximately along the central axis line L of the mounting hole 12, for example. In an unmounted state, the first water-blocking portion 33 opposes the locking piece 22 in a direction along the central axis line L, for example. The first water-blocking portion 33 includes an inclined surface 37 on a side face on the outer circumferential side, for example. The inclined surface 37 inclines toward the inner circumference from the opposing portion 32 side toward the vehicle body panel 11. The inner side surface of the first water-blocking portion 33 and the inner side surface of the opposing portion 32 oppose the outer circumferential surface 21a of the tube portion 21 in the first direction D.

In the mounted state, the first water-blocking portion 33 is interposed between the circumferential edge of the mounting hole 12 and the tube portion 21 in the first direction D. In the present embodiment, the bent portion 15 that is bent to the opposite side to the opposing portion 32 is formed at the circumferential edge of the mounting hole 12. In this manner, the first water-blocking portion 33 is interposed between the bent portion 15 and the tube portion 21 in the first direction D. The bent portion 15 is formed by bending a plate material constituting the vehicle body panel 11. In this manner, the bent portion 15 includes a curved surface. The first water-blocking portion 33 is in contact with the curved surface of the bent portion 15.

Configuration of Second Water-Blocking Portion 34

As shown in FIGS. 2 and 3, the second water-blocking portion 34 includes a base portion 40, a first lip portion 41, and a second lip portion 42.

The base portion 40 is formed in an annular shape that conforms to the circumferential edge of the mounting hole 12. The base portion 40 extends toward the vehicle body panel 11 while inclining toward the outer circumference. Accordingly, as shown in FIG. 4, the base portion 40 is likely to fall toward the outer circumference due to the leading end of the second water-blocking portion 34 coming in contact with the vehicle body panel 11. For this reason, the insertion force at the time of mounting the grommet 10 into the mounting hole 12 is reduced. Also, due to the base portion 40 having the inclined shape, the deformation of the base portion 40 in the mounted state is limited to deformation toward the outer circumference. In this manner, the deformation of the second water-blocking portion 34 in the mounted state is stabilized.

As shown in FIG. 2 and FIG. 3, the first lip portion 41 and the second lip portion 42 each extend from the leading end of the base portion 40. The first lip portion 41 and the second lip portion 42 are formed in an annular shape that conforms to the circumferential edge of the mounting hole 12. The second lip portion 42 is provided on the inner circumferential side of the first lip portion 41. The first lip portion 41 and the second lip portion 42 oppose each other in the first direction D. The first lip portion 41 extends from the opposing portion 32 side toward the vehicle body panel 11 while inclining toward the outer circumference. The second lip portion 42 extends from the opposing portion 32 side toward the vehicle body panel 11 while inclining toward the inner circumference, which is toward the first water-blocking portion 33.

The base portion 40 and the first lip portion 41 extend in the same direction, for example. In other words, the base portion 40 and the first lip portion 41 are formed such that a cross-sectional shape that is parallel to and passes through the central axis line L extends in a straight line. The second lip portion 42 extends so as to branch from an intermediate portion of a portion formed by the base portion 40 and the first lip portion 41 that extends in a straight line. In the unmounted state, the leading end position of the first lip portion 41 is spaced further apart from the opposing portion 32 than is the leading end position of the second lip portion 42. In the mounted state, the leading end of the first lip portion 41 is in contact with the first surface 13 of the vehicle body panel 11.

The second lip portion 42 includes a first extended portion 51 that extends from the base portion 40 and a second extended portion 52 that extends from the leading end of the first extended portion 51. The inclination angle of the first extended portion 51 and the inclination angle of the second extended portion 52 are different from each other. Specifically, the second lip portion 42 includes a bent portion 53 between the first extended portion 51 and the second extended portion 52. The inclination of the second extended portion 52 is closer to perpendicular to the vehicle body panel 11 than the inclination of the first extended portion 51. In the mounted state, the second extended portion 52 is in contact with the first surface 13 of the vehicle body panel 11.

Configuration of Supporting Portion 35

As shown in FIG. 2 and FIG. 3, the supporting portion 35 is formed in an annular shape that conforms to the circumferential edge of the mounting hole 12. The supporting portion 35 extends from the outer edge of the opposing portion 32 toward the vehicle body panel 11. In the unmounted state, the leading end portion of the supporting portion 35 extends toward the vehicle body panel 11 while being displaced toward the inner circumference, which is toward the second water-blocking portion 34, for example.

As shown in FIG. 4, the entire circumference of the supporting portion 35 is in close contact with the vehicle body panel 11. Since the leading end of the supporting portion 35 is displaced toward the inner circumference in the unmounted state as described above, in the mounted state, the leading end portion of the supporting portion 35 bends toward the inner circumference due to contact with the vehicle body panel 11. The supporting portion 35 acts to stabilize the orientation of the grommet 10 in the mounted state.

The operation of the present embodiment will be described below.

In the vehicle body panel 11, the second surface 14 side, which is on the vehicle exterior side, is likely to get wet. Water on the second surface 14 side is likely to enter toward the first surface 13 through a gap between the circumferential edge of the mounting hole 12 and the tube portion 21 of the inner member 20. Here, the entire circumference of the first water-blocking portion 33 is sandwiched and compressed between the circumferential edge of the mounting hole 12 and the outer circumferential surface 21a of the tube portion 21. In this manner, water on the second surface 14 side is suppressed from entering through the gap between the mounting hole 12 and the tube portion 21.

The water that could not be prevented from entering by the first water-blocking portion 33 enters between the first water-blocking portion 33 and the second water-blocking portion 34. The water is blocked so as not to enter the outer circumferential side of the second water-blocking portion 34 by the second water-blocking portion 34. Here, in the mounted state, the second water-blocking portion 34 suctions to the first surface 13 of the vehicle body panel 11 due to the shapes of the first lip portion 41 and the second lip portion 42. In other words, a space surrounded by the first lip portion 41, the second lip portion 42, and the vehicle body panel 11 is converted to negative pressure, and as a result, the first lip portion 41 and the second lip portion 42 suction to the vehicle body panel 11 due to the action of external air pressure. In the state in which the second water-blocking portion 34 suctions to the vehicle body panel 11, the first lip portion 41 and the second lip portion 42 come in contact with the vehicle body panel 11 without distortion. For this reason, in this state, it is very unlikely that a gap will be generated between the first and second lip portions 41 and 42, and the vehicle body panel 11.

Note that, in the mounted state, the first lip portion 41 and the second lip portion 42 are spaced apart from the opposing portion 32. In this manner, the first lip portion 41 and the second lip portion 42 that suction to the vehicle body panel 11 are not squashed by the opposing portion 32. For this reason, the state in which the first lip portion 41 and the second lip portion 42 suction to the vehicle body panel 11 is favorably maintained.

Most of the water that attempts to enter from the second surface 14 side of the vehicle body panel 11 toward the first surface 13 is blocked by the first water-blocking portion 33 and the second water-blocking portion 34. However, in some cases, even the second water-blocking portion 34 cannot block water and a small amount of water enters the outer circumferential side of the second water-blocking portion 34. At this time, the water that has entered the outer circumferential side of the second water-blocking portion 34 is blocked by the supporting portion 35 that is in close contact with the first surface 13. In other words, the supporting portion 35 is configured as a third water-blocking portion of the grommet 10.

As described above, the grommet 10 of the present embodiment has a water-blocking structure that blocks water that attempts to enter from the second surface 14 side of the vehicle body panel 11 toward the first surface 13 at three stages; namely, the first water-blocking portion 33, the second water-blocking portion 34, and the supporting portion 35.

The effects of the present embodiment will be described below.

(1) The first water-blocking portion 33 and the second water-blocking portion 34 each have an annular shape surrounding the mounting hole 12. The second water-blocking portion 34 is provided on the outer circumferential side of the first water-blocking portion 33. With this configuration, for example, when water attempts to enter from the second surface 14 side of the vehicle body panel 11 toward the first surface 13 through the mounting hole 12, the entry of water can be suppressed at multiple stages by the first water-blocking portion 33 and the second water-blocking portion 34. In this manner, the water blocking property of the grommet 10 can be improved.

(2) The first water-blocking portion 33 is sandwiched between the circumferential edge of the mounting hole 12 and the tube portion 21 of the inner member 20 in the first direction D that is orthogonal to the central axis line L of the mounting hole 12. Accordingly, it is possible to favorably water-block the gap between the circumferential edge of the mounting hole 12 and the tube portion 21 by the first water-blocking portion 33.

Also, since the inner member 20 is a comparatively highly rigid member, a gap is provided between the tube portion 21 and the mounting hole 12 in order to prevent interference between the tube portion 21 of the inner member 20 and the mounting hole 12 due to dimension variation. Also, the flexible first water-blocking portion 33 is interposed in the gap between the tube portion 21 and the mounting hole 12. In this manner, looseness of the inner member 20 is suppressed by the first water-blocking portion 33.

Also, the first water-blocking portion 33 is positioned in the gap between the tube portion 21 and the mounting hole 12 around the entire circumference. Accordingly, the first water-blocking portion 33 acts to guide the tube portion 21 such that the central axis line of the tube portion 21 coincides with the central axis line L of the mounting hole 12. In this manner, since the inner member 20 is appropriately positioned by the first water-blocking portion 33, it is possible to provide the grommet 10 that exhibits a stable water blocking property.

(3) The vehicle body panel 11 includes the bent portion 15 in which the circumferential edge of the mounting hole 12 is bent to the opposite side to the opposing portion 32. Also, the first water-blocking portion 33 is sandwiched between the bent portion 15 of the mounting hole 12 and the tube portion 21 in the first direction D. In this manner, a configuration can be achieved in which the first water-blocking portion 33 is not in contact with the circumferential edge of the mounting hole 12. Accordingly, damage to the first water-blocking portion 33 can be suppressed, and as a result, deterioration of the water blocking property of the first water-blocking portion 33 can be suppressed.

(4) The vehicle body panel 11 is a panel that partitions the vehicle interior and the vehicle exterior of the vehicle. Also, the opposing portion 32, the first water-blocking portion 33, and the second water-blocking portion 34 are located on the vehicle interior side of the vehicle body panel 11. Water is likely to enter the vehicle exterior side of the vehicle body panel 11. When the water on the vehicle exterior side attempts to enter the vehicle interior through the gap between the circumferential edge of the mounting hole 12 and the tube portion 21 of the inner member 20, entry of the water can be suppressed first by the first water-blocking portion 33, and then by the second water-blocking portion 34.

(5) The grommet 10 is provided with the supporting portion 35 that extends from the opposing portion 32 and comes in contact with the vehicle body panel 11. The supporting portion 35 is formed in an annular shape surrounding the mounting hole 12. Also, the supporting portion 35 is provided on the outer circumferential side of the second water-blocking portion 34. According to this configuration, the orientation of the grommet 10 in the state of being mounted to the vehicle body panel 11 is stabilized by the supporting portion 35 that is in contact with the vehicle body panel 11. In this manner, it is possible to suppress the situation in which the grommet 10 inclines with respect to the mounting hole 12 due to a force received from the wire harness W or the like, for example. As a result, it is possible to suppress a case in which the contact pressure of the first water-blocking portion 33 and the second water-blocking portion 34 against the vehicle body panel 11 partially decreases.

(6) The supporting portion 35 extends from the outer edge of the opposing portion 32. With this configuration, it is possible to suppress the inclination of the grommet 10 more favorably by the supporting portion 35 that extends from the outer edge of the opposing portion 32.

(7) The entire circumference of the supporting portion 35 is in close contact with the vehicle body panel 11. With this configuration, water that runs along the vehicle body panel 11 can be blocked by the supporting portion 35.

(8) The second water-blocking portion 34 includes the first lip portion 41 that extends from the opposing portion 32 side toward the vehicle body panel 11 while inclining toward the outer circumference, and the second lip portion 42 that extends from the opposing portion 32 toward the vehicle body panel 11 while inclining toward the inner circumference, which is toward the first water-blocking portion 33. With this configuration, when the first lip portion 41 and the second lip portion 42 are brought into close contact with the vehicle body panel 11, the second water-blocking portion 34 can be caused to suction to the vehicle body panel 11 with the space surrounded by the first lip portion 41, the second lip portion 42, and the vehicle body panel 11 being converted to negative pressure. When the second water-blocking portion 34 suctions to the vehicle body panel 11, a gap is unlikely to be generated between the vehicle body panel 11 and the second water-blocking portion 34, and as a result, the water blocking property of the second water-blocking portion 34 can be improved.

(9) In the state of being mounted to the vehicle body panel 11, the first lip portion 41 and the second lip portion 42 are each spaced apart from the opposing portion 32. With this configuration, it is possible to prevent a case in which the first lip portion 41 and the second lip portion 42 that suction to the vehicle body panel 11 are squashed by the opposing portion 32. As a result, the state in which the first lip portion 41 and the second lip portion 42 suction to the vehicle body panel 11 can be favorably maintained.

(10) The second water-blocking portion 34 includes the base portion 40 that extends from the opposing portion 32, with the first lip portion 41 and the second lip portion 42 extending from the leading end thereof.

With this configuration, it is possible to reduce the insertion force at the time of inserting the grommet 10 into the mounting hole 12, due to the deformation of the base portion 40 while bringing the first lip portion 41 and the second lip portion 42 into close contact with the vehicle body panel 11. As a result, it is possible to contribute to improvement of mountability of the grommet 10.

(11) The base portion 40 extends toward the vehicle body panel 11 while inclining toward the outer circumference. With this configuration, when the second water-blocking portion 34 is pressed against the vehicle body panel 11, the base portion 40 of the second water-blocking portion 34 can be favorably bent toward the outer circumference or inner circumference. In this manner, it is possible to reduce an insertion force at the time of inserting the grommet 10 into the mounting hole 12 more favorably. As a result, it is possible to further contribute to the improvement of mountability of the grommet 10.

(12) The base portion 40 and the first lip portion 41 extend in the same direction. With this configuration, it is possible to favorably bring the first lip portion 41 into close contact with the vehicle body panel 11.

(13) The second lip portion 42 includes the first extended portion 51 extending from the base portion 40 and the second extended portion 52 extending from the leading end of the first extended portion 51. The inclination of the second extended portion 52 is closer to perpendicular to the vehicle body panel 11 than the inclination of the first extended portion 51. With this configuration, it is possible to bring the leading end of the second lip portion 42, that is, the leading end of the second extended portion 52, into contact with the vehicle body panel 11 at an angle closer to perpendicular to the vehicle body panel 11. With this configuration, it is possible to favorably bring the second lip portion 42 into close contact with the vehicle body panel 11.

(14) The leading end position of the first lip portion 41 is spaced apart from the opposing portion 32 more than the leading end position of the second lip portion 42. With this configuration, when the grommet 10 is inserted into the mounting hole 12, in the second water-blocking portion 34, the first lip portion 41 first comes in contact with the vehicle body panel 11, and then the second lip portion 42 comes in contact with the vehicle body panel 11. In this manner, in the state of being mounted to the vehicle body panel 11, the first lip portion 41 and the second lip portion 42 can be compressively deformed more favorably.

The present embodiment can be implemented by making modifications as follows. The present embodiment and the modifications below may be implemented in combination with each other as long as no technical contradictions arise.

In the first direction D, a configuration is also possible in which the first water-blocking portion 33 is not sandwiched between the circumferential edge of the mounting hole 12 and the tube portion 21, and the first water-blocking portion 33 is merely in contact with the first surface 13 of the vehicle body panel 11, for example.

The shape of the base portion 40 is not limited to the above-described embodiment, and may be changed as appropriate. For example, a configuration is also possible in which the base portion 40 extends toward the vehicle body panel 11 while inclining toward the inner circumference. According to this configuration, when the second water-blocking portion 34 is pressed against the vehicle body panel 11, the base portion 40 of the second water-blocking portion 34 can be favorably bent toward the inner circumference. Also, for example, a configuration is possible in which the base portion 40 extends perpendicular to the vehicle body panel 11.

The shape of the first lip portion 41 is not limited to the above-described embodiment, and may be changed as appropriate. For example, the inclination angle of the first lip portion 41 may be different from the inclination angle of the base portion 40. A configuration is also possible in which the first lip portion 41 bends at an intermediate portion thereof.

The shape of the second lip portion 42 is not limited to the above-described embodiment, and may be changed as appropriate. For example, a configuration is also possible in which, the second lip portion 42 is provided with no bent portion 53 and extends in a straight line.

In the second water-blocking portion 34 of the above-described embodiment, the leading end position of the second lip portion 42 may be set to a position that is spaced further apart from the opposing portion 32 than is the leading end position of the first lip portion 41. According to this configuration, when the grommet 10 is inserted into the mounting hole 12, it is possible to bring in the second water-blocking portion 34, the second lip portion 42 comes in contact with the vehicle body panel 11 first, and then the first lip portion 41 in contact with the vehicle body panel 11.

In the second water-blocking portion 34 of the above-described embodiment, the first lip portion 41 and the second lip portion 42 extend from the base portion 40, but there is no limitation to this, and a configuration is also possible in which the base portion 40 is omitted and the first lip portion 41 and the second lip portion 42 extend from the opposing portion 32.

In the above-described embodiment, in the mounted state, each of the first lip portion 41 and the second lip portion 42 is spaced apart from the opposing portion 32, but there is no limitation to this, and a configuration is also possible in which, in the mounted state, the first lip portion 41 and the second lip portion 42 are in contact with the opposing portion 32.

The second water-blocking portion 34 of the above-described embodiment is provided with the first lip portion 41 and the second lip portion 42 that branch from the base portion 40, but there is no limitation to this, and a configuration is also possible in which the base portion 40 does not branch.

The position of the base of the supporting portion 35 may be changed from the outer edge of the opposing portion 32 to a location closer to the inner circumference.

In the above-described embodiment, the entire circumference of the supporting portion 35 is in close contact with the vehicle body panel 11, but there is no limitation to this. A configuration is also possible in which part of the supporting portion 35 in the circumferential direction comes in contact with the vehicle body panel 11, for example. Also, a configuration is possible in which a plurality of supporting portions 35 are dispersedly located in the circumferential direction of the opposing portion 32, for example. That is, the supporting portion 35 need not necessarily have the water blocking property, unlike these modifications.

In the above-described embodiment, the supporting portion 35 may also be omitted.

The materials that form the grommet main body 30 and the inner member 20 are not limited to the above-described embodiment, and may be changed as appropriate in accordance with the configuration.

The above-described embodiment is applied to the grommet 10 that is mounted from the vehicle interior side with respect to the mounting hole 12, but the embodiment may also be applied to a grommet that is mounted from the vehicle exterior side.

The above-described embodiment is applied to the grommet 10 that is attached into the mounting hole 12 in which the bent portion 15 is formed, but there is no limitation to this, and the embodiment may also be applied to a grommet that is to be attached into the mounting hole 12 with no bent portion 15.

The above-described embodiment is applied to the grommet 10 that is formed by the grommet main body 30 that is formed by a highly flexible material such as elastomer and the inner member 20 that is more rigid than the grommet main body 30. However, there is no limitation to this in particular, and the embodiment may also be applied to a grommet formed only by a highly flexible material.

The embodiments and the modifications disclosed herein should be considered exemplary in all respects and not restrictive. The scope of the present invention is indicated not by the above-described meaning, but by the claims, and all changes that come within the meaning and range of equivalency of the claims are intended to be embraced therein.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A grommet that is to be mounted into a mounting hole of a vehicle body panel through which a wire harness is to be passed, the grommet comprising:

an opposing portion that is to oppose a portion surrounding the mounting hole in the vehicle body panel;

a first water-blocking portion that extends from the opposing portion and is to come in contact with the vehicle body panel; and a second water-blocking portion that extends from the opposing portion and is to come in contact with the vehicle body panel, wherein each of the first water-blocking portion and the second water-blocking portion is formed in an annular shape that is to surround the mounting hole, the second water-blocking portion is provided on an outer circumferential side with respect to the first water-blocking portion, and the second water-blocking portion includes a first lip portion that extends from the opposing portion side toward the vehicle body panel while inclining toward the outer circumference, and a second lip portion that extends from the opposing portion side toward the vehicle body panel while inclining toward an inner circumference, which is toward the first water-blocking portion.

2. The grommet according to claim 1, comprising:
a supporting portion that extends from the opposing portion and is to come in contact with the vehicle body panel,
wherein the supporting portion is formed in an annular shape that surrounds the mounting hole, and
the supporting portion is provided on the outer circumferential side with respect to the second water-blocking portion.

3. The grommet according to claim 2,
wherein the supporting portion extends from an outer edge of the opposing portion.

4. The grommet according to claim 2,
wherein an entire circumference of the supporting portion is to be in close contact with the vehicle body panel.

5. The grommet according to claim 1,
wherein in a state in which the grommet is mounted to the vehicle body panel, each of the first lip portion and the second lip portion is spaced apart from the opposing portion.

6. The grommet according to claim 1,
wherein the second water-blocking portion includes a base portion that extends from the opposing portion, and the first lip portion and the second lip portion extend from a leading end of the base portion.

7. The grommet according to claim 6,
wherein the base portion extends toward the vehicle body panel while inclining toward the outer circumference or the inner circumference.

8. The grommet according to claim 7,
wherein the base portion extends toward the vehicle body panel while inclining toward the outer circumference, and
the base portion and the first lip portion extend in the same direction.

9. The grommet according to claim 8,
wherein the second lip portion includes a first extended portion that extends from the base portion and a second extended portion that extends from the leading end of the first extended portion, and
an inclination of the second extended portion is closer to perpendicular to the vehicle body panel than the inclination of the first extended portion.

10. The grommet according to claim 8,
wherein a leading end position of the first lip portion is spaced further apart from the opposing portion than is a leading end position of the second lip portion.

11. A grommet that is to be mounted into a mounting hole of a vehicle body panel through which a wire harness is to be passed, the grommet comprising:
an opposing portion that is to oppose a portion surrounding the mounting hole in the vehicle body panel;
a first water-blocking portion that extends from the opposing portion and is to come in contact with the vehicle body panel;
a second water-blocking portion that extends from the opposing portion and is to come in contact with the vehicle body panel;
an inner member including a tube portion into which the wire harness is to be inserted and a flange portion that extends from the tube portion toward the outer circumference; and
a grommet main body including the opposing portion, the first water-blocking portion, and the second water-blocking portion,
wherein each of the first water-blocking portion and the second water-blocking portion is formed in an annular shape that is to surround the mounting hole,
the second water-blocking portion is provided on an outer circumferential side with respect to the first water-blocking portion,
the inner member is formed by a material that is more rigid than the grommet main body,
the tube portion is to be inserted into the mounting hole,
the opposing portion, the first water-blocking portion, and the second water-blocking portion are to be sandwiched and compressed by the flange portion and the vehicle body panel, and
the first water-blocking portion is to be sandwiched by a circumferential edge of the mounting hole and the tube portion in a first direction that is orthogonal to a central axis line of the mounting hole.

12. The grommet according to claim 11,
wherein the vehicle body panel includes a bent portion in which the circumferential edge of the mounting hole is bent to an opposite side to the opposing portion side, and
the first water-blocking portion is to be sandwiched by the bent portion and the tube portion in the first direction.

13. The grommet according to claim 11,
wherein the vehicle body panel is a panel that partitions a vehicle interior and a vehicle exterior of a vehicle, and
the opposing portion, the first water-blocking portion, and the second water-blocking portion are located on the vehicle interior side of the vehicle body panel.

\* \* \* \* \*